United States Patent [19]
Curtis

[11] 3,885,491
[45] May 27, 1975

[54] LOCKING STAPLE
[75] Inventor: Gary Martin Curtis, Elgin, Ill.
[73] Assignee: Illinois Tool Works Inc., Chicago, Ill.
[22] Filed: Dec. 21, 1973
[21] Appl. No.: 427,237

[52] U.S. Cl. ............ 85/49; 151/38; 248/71
[51] Int. Cl. .............. F16b 15/00; F16b 39/24
[58] Field of Search ........... 85/49, 11, 13; 151/38, 151/35, 41, 13, 41.73, 37; 248/71

[56] References Cited
UNITED STATES PATENTS

| | | | |
|---|---|---|---|
| 605,078 | 6/1898 | Charlton et al. | 151/13 |
| 782,266 | 2/1905 | Poince | 151/41 |
| 884,290 | 4/1908 | De Oca | 151/37 |
| 930,808 | 8/1909 | Smith | 151/38 |
| 957,504 | 5/1910 | Frenot | 151/41 |
| 1,007,738 | 11/1911 | Seago | 151/41 |
| 2,309,261 | 1/1943 | Tallman | 248/71 |
| 2,345,053 | 3/1944 | Judd et al. | 85/49 X |
| 2,396,588 | 3/1946 | Luce | 151/37 |
| 2,698,444 | 1/1955 | Piliero | 85/49 X |
| 2,794,476 | 6/1957 | Hanneman | 151/38 X |

FOREIGN PATENTS OR APPLICATIONS
453,224  12/1948  Canada .................. 151/41

Primary Examiner—Ramon S. Britts
Attorney, Agent, or Firm—Olson, Trexler, Wolters, Bushnell & Fosse, Ltd.

[57] ABSTRACT

A fastening staple is provided which comprises a pair of workpiece-penetrating legs and an interconnecting bridge. Arms are connected to the bridge at fulcrum points, and each arm is crimped to provide a surface extending below the plane of the bridge. As the staple is forced into the workpiece, the crimps engage the workpiece surface and force the arms to rotate out of the bridge plane to engage a screw, wire or similar member and fasten it to the staple workpiece.

3 Claims, 8 Drawing Figures

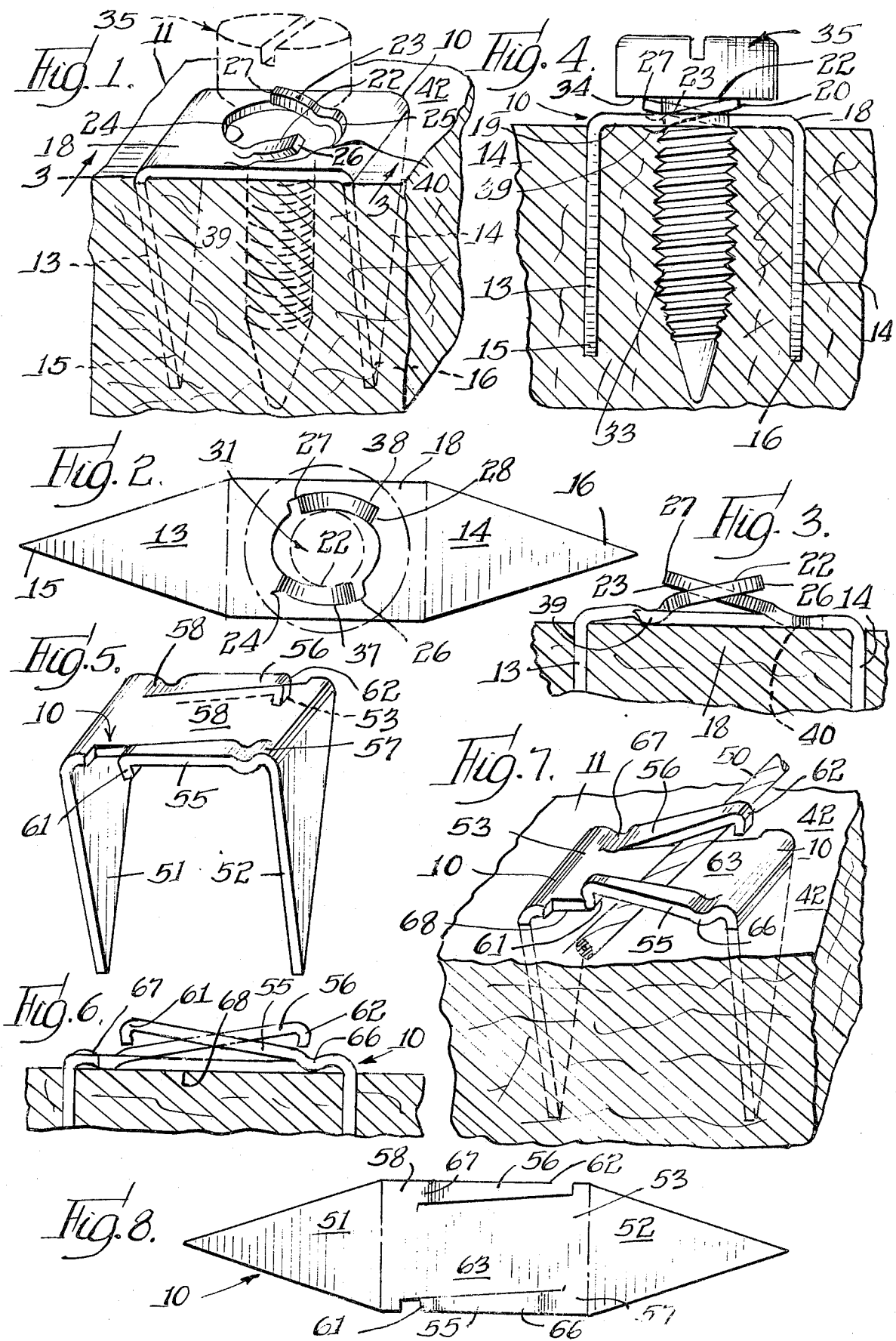

LOCKING STAPLE

BACKGROUND OF THE INVENTION

This invention relates generally to fastening devices, are more particularly concerns a staple device for securing screws, wires and the like to a workpiece.

It is the general object of this invention to provide an easily manufactured and inexpensive staple member for fastening screws, wires and the like to wooden workpieces or similar members into which the staple can be forced.

It is another object of the invention to provide such a staple which will positively lock the screw or wire upon the workpiece.

It is yet another object of the invention to provide a staple member of the type described which permits the screw or wire to be locked to the workpiece by securely engaging the screw or wire at locations above the staple rather than securing the screw or wire between the staple and the workpiece. A related object is to provide a fastening staple which permits removal of the screw or wire from the workpiece without necessarily removing the staple from the workpiece.

Other objects and advantages of the invention will become apparent upon reading the following detailed description and upon reference to the drawings. Throughout the description, like reference numerals refer to like parts.

BRIEF DESCRIPTION OF THE DRAWINGS

FIG. 1 is a perspective view showing one embodiment of the novel fastening staple as it appears when it has been inserted into a typical workpiece;

FIG. 2 is a planar view showing a staple of FIG. 1 as it appears during an intermediate manufacturing assembly operation;

FIG. 3 is a sectional view taken substantially in the plane of line 3—3 in FIG. 1;

FIG. 4 is a sectional view similar to FIG. 3 and showing the novel staple as it appears after insertion of an associated screw through the staple bridge and into the workpiece;

FIG. 5 is a perspective view of an alternate embodiment of the novel fastening staple;

FIG. 6 is a sectional view of the alternate embodiment similar to FIGS. 3 and 4;

FIG. 7 is a perspective view of the alternate embodiment similar to FIG. 1; and

FIG. 8 is a plan view of the alternate embodiment similar to FIG. 2.

DETAILED DESCRIPTION

While the invention will be described in connection with several preferred embodiments, it will be understood that it is not intended to limit the invention to those embodiments. On the contrary, it is intended to cover all alternatives, modifications and equivalents as may be included within the spirit and scope of the invention.

Turning first to FIG. 1, there is shown one embodiment of the novel staple 10 as it appears when inserted into a typical workpiece 11, which may be a wooden beam or other member. The staple 10 includes a pair of legs 13 and 14, which are here tapered and terminate in workpiece-penetrating points 15 and 16 respectively. Interconnecting the legs 13 and 14 is a planar bridge 18 which has an underside surface 19 exposed in the direction of penetration of the legs 13 and 14.

In accordance with the invention, a number of arms 22 and 23 are formed on the bridge 18 for rotation out of the bridge plane about respective fulcrum points 24 and 25. Opposite its fulcrum point 24 or 25, each arm 22 or 23 is provided with a respective free end 26 or 27 adapted to engage a member to be secured to the workpiece 11.

In the embodiment illustrated in FIGS. 1–4, the member to be secured to the workpiece takes the form of a screw 30. An enclosed cutout 31 is formed in the general center of the bridge 18, and is dimensioned to permit a shank 33 of the screw 30 to pass through the bridge 18 and into the workpiece 11. As may be envisioned from FIGS. 1 and 4, the curved arms 22 and 23 located adjacent the cutout 31 are adapted to engage an undersurface 34 formed on a screw head 35 to lock the screw 30 in the illustrated position protruding from the workpiece 11. When so engaged and locked, the screw 30 is inhibited from rotation which would permit the screw to work its way loose from the workpiece 11 and staple 10. In this regard, it will be noted that the free ends 26 and 27 of the respective arms 22 and 23 each engage the screw head underside 34 at relatively acute angles.

In carrying out the invention, the arms 22 and 23 are progressively rotated out of the plane of the bridge 18 and into their screw-engaging positions as the staple 10 is progressively forced into the workpiece 11. To this end, arm rotating means are provided intermediate each arm free end 26 or 27 and the respective arm fulcrum 24 or 25. In the illustrated embodiment, these arm rotating means take the form of crimps 37 and 38 formed in each arm and having lower surfaces 39 and 40 respectively which extend below the exposed surface 19 of the bridge to engage the top surface 42 of the workpiece 11.

To provide arm rotating motion generally proportioned to staple insertion motion, these crimps 37 and 38 are arcuate in configuration. As the staple 10 is pounded or otherwise inserted into the workpiece 11, the crimps 37 and 38 engage the workpiece surface 42 before the exposed bridge surface 19 abuts the surface 42 and halts further staple inserting motion. When the crimps 37 and 39 engage the workpiece surface 42, they thereafter force the arms 22 and 23 to be rotated out of the plane of the bridge 18 to locate the arm free ends 26 and 27 away from the bridge 18 and the workpiece 11 in positions to engage the screw 30. If desired, the arms 22 and 23 can be located in rest or unstressed positions 44 which are located below the plane of the bridge 18.

In accordance with another aspect of the invention, manufacturing costs can be reduced by forming this novel staple 10 from a stamping of uniform cross-sectional thickness.

A second embodiment of the invention, especially adapted for retaining an item such as a wire 50 in a preselected position upon a workpiece 11, is shown in FIGS. 5–8, inclusive. In this embodiment, the staple includes legs 51 and 52 interconnected by a bridge 53 in a manner similar to the embodiment illustrated in FIGS. 1–4, inclusive. Formed on extreme opposite sides of the bridge 53 are arms 55 and 56. These arms 55 and 56 are connected, as by fulcrum points 57 and 58, to the bridge 53 so as to rotate in opposite directions as the staple 10 is urged into the workpiece 11. Each arm 55 and 56 is provided with a hooked free end 61 and 62, respectively, which is adapted to retain a wire 50 layed over the top 63 of the bridge 53. As in the embodiment described above, arm rotating crimp means 66 and 67 are formed on the arms 55 and 56 and extend below the exposed bridge underside surface 68 to engage the workpiece surface 42 before the exposed bridge underside surface 68 engages it, as the staple is progressively forced into the workpiece 11. When the arms 55 and 56 are raised into the positions illustrated in FIGS. 6 and 7, the wire 50 can be secured in place by a simple rotational twist applied to the wire section illustrated. Since the wire 50 overlays the staple 10, rather then being pinned between the staple 10 and workpiece 11, the wire 50 can be easily removed when desired without necessarily removing the staple. Absent positive removal action, however, the wire is securely held in the illustrated position.

The invention is claimed as follows:

1. A one-piece generally U-shaped staple device for the attachment of wires or the like to a support surface, the staple device including a pair of legs extending in a first direction each having workpiece penetrating points and a planar bridge portion interconnecting said pair of legs and providing an impact driving surface for the staple device, a pair of arms formed integrally to the staple extending between the legs, each arm having a free end and said free ends being disposed adjacent opposing extremities of the bridge, the arms being generally planar and generally positioned in the plane of the bridge, crimped surfaces forming arm rotating means on the arms extending downwardly in said first direction from the plane of the arms and the bridge and located intermediate the free extremity and the point of connection of the arm with the staple thereby adapted to engage the support surface prior to the engagement of the bridge with the support surface to progressively rotate the arms out of the bridge plane in a direction away from the support surface as the staple is driven into the workpiece, the free extremities of each arm including hook means extending downwardly in said first direction to retain the wire beneath the arms and on top of the bridge surface.

2. A fastening staple according to claim 1 wherein the exposed surfaces of said crimps are arcuate in configuration to provide arm rotating motion generally proportioned to staple insertion motion.

3. A fastening staple according to claim 1 wherein said staple is formed of a stamping of uniform cross-sectional thickness.

* * * * *